United States Patent

Hines et al.

[11] 3,710,849
[45] Jan. 16, 1973

[54] LENS BLOCKING MACHINE

[75] Inventors: Robert R. Hines, Phelps; Harold Culver, Geneva, both of N.Y.

[73] Assignee: Textron Inc., Providence, R.I.

[22] Filed: Jan. 21, 1971

[21] Appl. No.: 108,432

[52] U.S. Cl. ............... 164/322, 164/332, 425/808
[51] Int. Cl. .................................. B22d 17/24
[58] Field of Search........ 164/18, 129, 167, 271, 322, 164/344; 18/DIG. 31; 51/277; 249/63, 67, 83; 425/808

[56] References Cited

UNITED STATES PATENTS

| | | | |
|---|---|---|---|
| 3,304,586 | 2/1967 | Buckminster | 18/DIG. 31 |
| 3,451,177 | 6/1969 | Buckminster | 51/277 |
| 3,257,686 | 6/1966 | Mecker | 18/DIG. 31 |
| 3,330,331 | 7/1967 | Duckwall | 18/DIG. 31 |
| 3,354,938 | 11/1967 | Carignan | 18/DIG. 31 |
| 3,468,366 | 9/1969 | Suddarth | 18/DIG. 31 |

Primary Examiner—J. Spencer Overholser
Assistant Examiner—John S. Brown
Attorney—Shlesinger, Fitzsimmons & Shlesinger

[57] ABSTRACT

Two lens holders mounted on a sliding table, which can be slid first right and then left to bring the lenses successively into position to be observed through a centrally disposed projection lens system and screen to correctly align them. After alignment each lens is clamped by an arm which carries a mold, and the table is shifted to bring the lens under the pour spout of a melting pot, and the mold is filled with a measured amount of alloy to mold a lens block onto the lens. While one block is being molded onto a lens at one pour station, another block is being allowed to cool to permit its removal from the table with the lens to which it has been molded.

5 Claims, 7 Drawing Figures

INVENTORS
ROBERT R. HINES AND
HAROLD CULVER

INVENTORS
ROBERT R. HINES AND
HAROLD CULVER
BY
Shlesinger, Fitzsimmons & Shlesinger
ATTORNEYS

LENS BLOCKING MACHINE

The present invention relates to lens blocking apparatus.

The prime object of this invention is to provide a machine for blocking ophthalmic lenses prior to edge grinding the lenses, which will be simpler in operation, and more compact than prior such machines.

Another object of the invention is to provide a machine of the character described, which offers all of the benefits of alloy blocking while affording precision in this operation.

Further objects of the invention are to provide a machine for blocking lenses which is designed for efficiency and minimal operator fatigue.

Other objects of the invention will be apparent hereinafter from the specification and from the recital of the appended claims, particularly when read in conjunction with the accompanying drawings.

The principal function of this machine is the accurate molding of an alloy block directly to the convex surface of an uncut lens for use in securing the lens in an edge grinding machine. With such a block the problem of lens slippage is eliminated; also a lens can be sized; and, if additional edging is required, the blocked lens can accurately be realigned in the edger. Elimination of a lens centering attachment also assures more accurate lens alignment.

On this machine all lenses must be marked for center before blocking. The marked lenses are located directly from reticle grid markings and projected, magnified, on a receiving screen. The projection system consists of a lamp of adequate candle power, a front surface mirror, two large condenser lenses, a three element projection lens system, a large front surface receiving mirror, and the rear projection receiving screen.

The receiving screen, which is located in the center of the machine, is a rear projection type which produces a clear sharp image without glare, and therefore greatly reduces eye fatigue.

The machine is equipped with a horizontal sliding lens table which comprises two lens locating reticles, and two block mold arms mounted on a single casting which slides horizontally. The table assembly slides on a rod and nylon bearings with adjustable stops at each end of the slide for precise location of the lens table with respect to two alloy melting pots. The two melting pots eliminate need of moving the melting pot to pouring position as was required on previous blockers. When the table slide is in its extreme left position for loading a lens on the right hand station, the left hand lens station is automatically in pouring position and vice versa.

Figure 1:
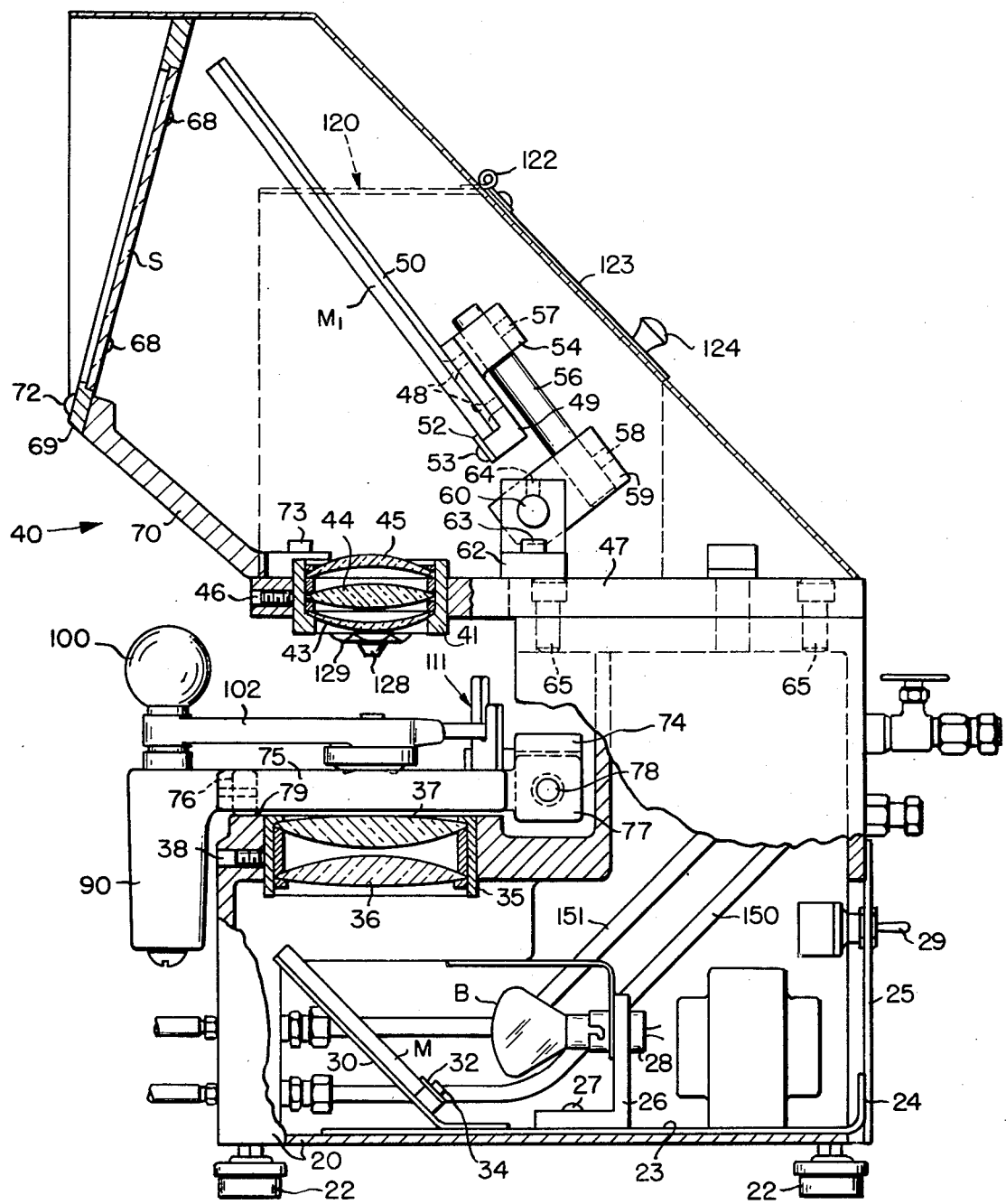
FIG. 1 is a part side elevational view, part vertical section of a machine built according to a presently preferred embodiment of this invention.

Referring now to the drawings by numerals of reference, 20 (FIG. 1) denotes the base of the machine, which is supported at four corners by the feet 22. Fastened to the base is a plate 23, which has an upturned portion 24 to which is riveted the nameplate 25 of the machine. An angle bracket 26, which is secured to the base by screws 27, serves to hold the socket 28 for a conventional light bulb B. A toggle switch 29 mounted in nameplate 25 is used through a conventional electrical circuit connection to turn lamp bulb B on and off. An obtuse angle bracket 30, which is secured to the base 20 in any suitable fashion, serves to provide a mount for a mirror M, which is held on the upwardly projecting arm of this angle bracket by clips 32 and screws 34.

Mounted above the mirror in registry therewith is a retaining ring 35 which carries the condenser lenses 36 and 37. A set screw 38, which threads into the base, holds the ring in position and against rotation.

Mounted above the ring 35 in the locator housing 40 of the machine is a second retaining ring 41, which, in the instance shown, carries the three axially aligned projection lenses 43, 44 and 45. This ring is held against rotation by the set screw 46 which threads into housing 40.

Secured by screws 48 to a bracket 49 is a plate 50 against which a mirror $M_1$ is mounted by means of clips 52 and screws 53. The bracket 49 has a rearwardly projecting portion 54, which is bored to receive a rod 56, and which is secured in any adjusted position on the rod by means of a set screw 57. Rod 56 is adjustably secured by means of a set screw 58 on an arm 59 which is pivotally adjustable on bar 60 that is carried by an angle bracket 62. Bracket 62 is fastened by a screw 63 to the base plate 47 of upper section 40; and arm 59 is secured in any adjusted position angularly on the bar 60 by means of a set screw 64. Upper section 40 is fastened to the base 20 of the machine by bolts 65.

The mirror $M_1$ is positioned in optical alignment with the lenses 43, 44 and 45 to reflect light from mirror M to a screen S which is secured by means of screws 68 in a frame 69 that is fastened to the bracket 70 by screws 71. Bracket 70 is secured to the plate 47 by screws 73.

The screen S is visible from the outside of the machine.

Mounted to slide on the base of the machine is a table 75. This table is supported and guided at its rear by a rod 78 (FIGS. 2 and 7), which extends from one side of the machine to the other. It has two spaced, bored ears 77, which are adapted to slide on rod 78. The table 75 is supported at its front by a roller 76 (FIGS. 1, 2, 5 and 6). This rolls on a guide surface 79 at the top of base 20 of the machine and which extends from one side to the other of the base. Stops 74 provided adjacent opposite sides of the machine limit the slide movement.

Figure 5:
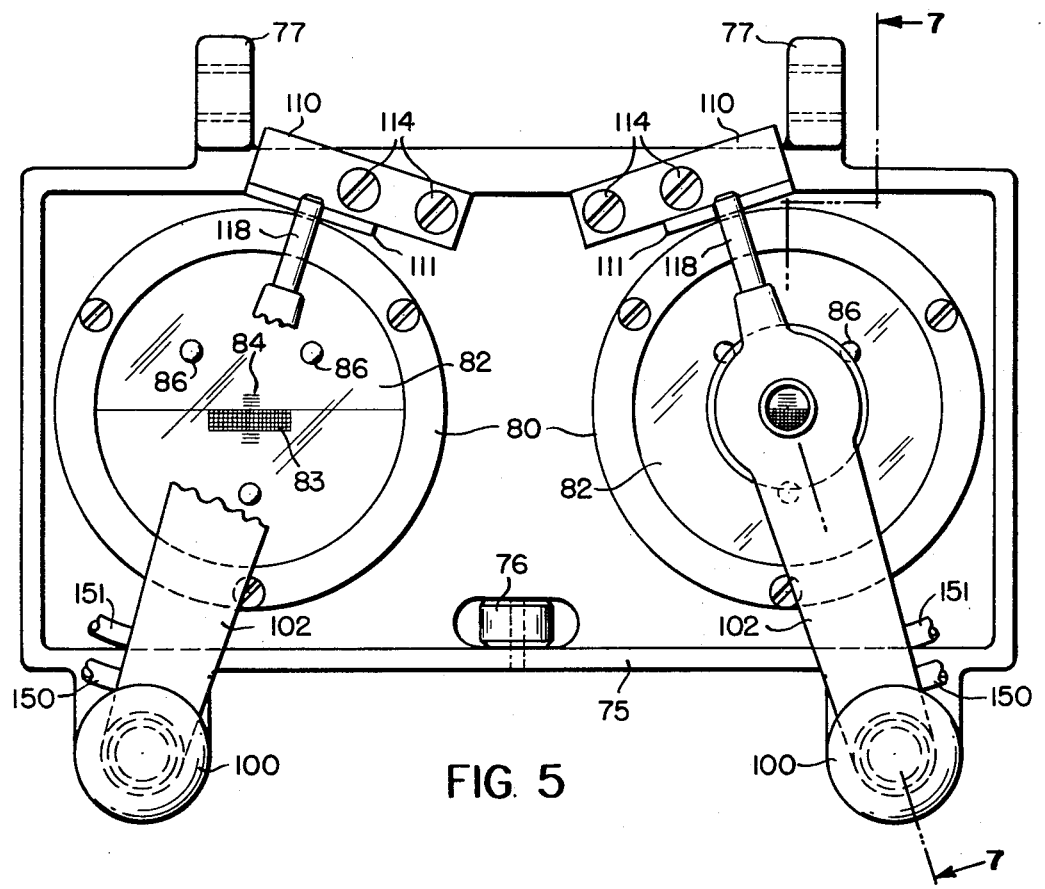
FIG. 5 is a plan view of the slide table of this machine, parts being broken away.
Figure 6:
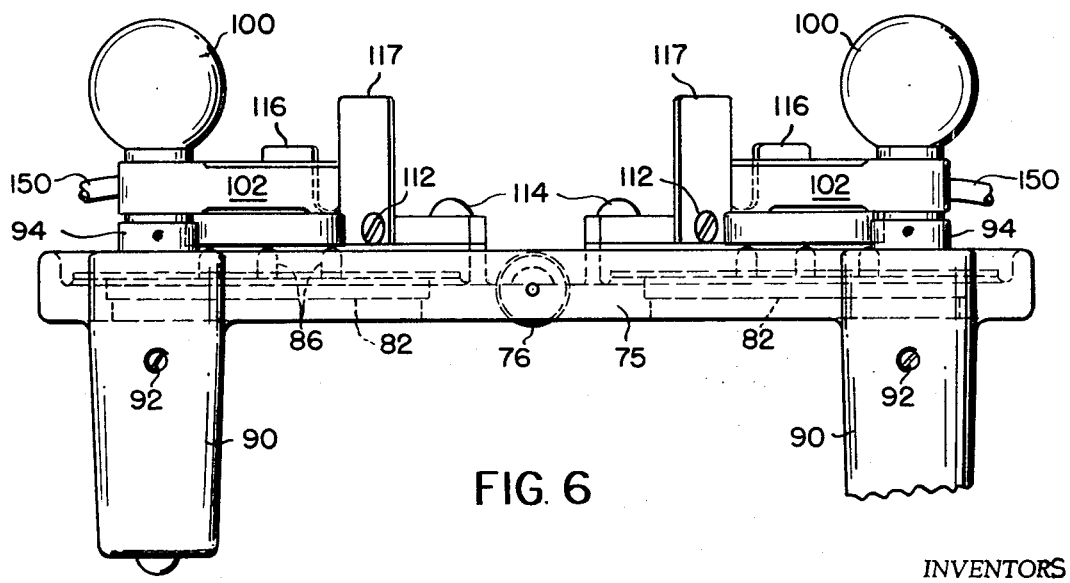
FIG. 6 is a front view of this slide table.

Fastened by rings 80 (FIG. 5) in two spaced openings 81 (FIG. 7) in the table 75 are two reticle plates 82, each of which is provided, as shown in FIG. 5 at the left, with two sets of graduations 83 and 84, which extend at right angles to one another, and which are provided to precisely position a lens blank, that is to be blocked, in the machine. Each reticle has three lens supporting posts 86 secured therein in approximately equiangular relation about the axis of the reticle to support a lens above the reticle.

The table 75 is formed with two laterally spaced sockets 90 (FIGS. 6 and 7) at its front. In each socket there is mounted a sleeve 91 (FIG. 7), which is fastened against movement relative thereto by the set screw 92. This sleeve has at its upper end a chordal portion which mates with and contacts the chordal portion of a second sleeve 94 which slides axially in socket 90 and is secured by a set screw 95 to a stud 96 which is threaded at its lower end to receive a screw 97 that holds a washer 98 against the lower end of the stud. A coil spring 99 surrounds the lower portion of each stud between the sleeve 91 and the washer 98. A knob 100 is threaded on the upper end of each stud. Secured to each stud by a set screw 101 beneath each knob 100 is an arm 102. Each arm has secured in it an annular mold 105, that carries in its flanged lower end on pins 107 a sealing ring 106 by means of which a lens blank L may be clamped on the supporting posts 86 of the associated reticle.

Associated with each arm 102 is a block 110 to which there is fastened a mold locator plate 111. Plate 111 is fastened to the block 110 by screws 112; and each block 110 is fastened to the table by screws 114.

Each of the locator plates 111 is formed with a recess 115 between a short arm 116 and a long arm 117. A pin 118, which is secured to the free extremity of each arm 102, is adapted to be engaged in the recess 115 in the associated plate 111 to lock the arm 102 and the associated sealing ring 106 in lens-clamping position.

Figure 2:
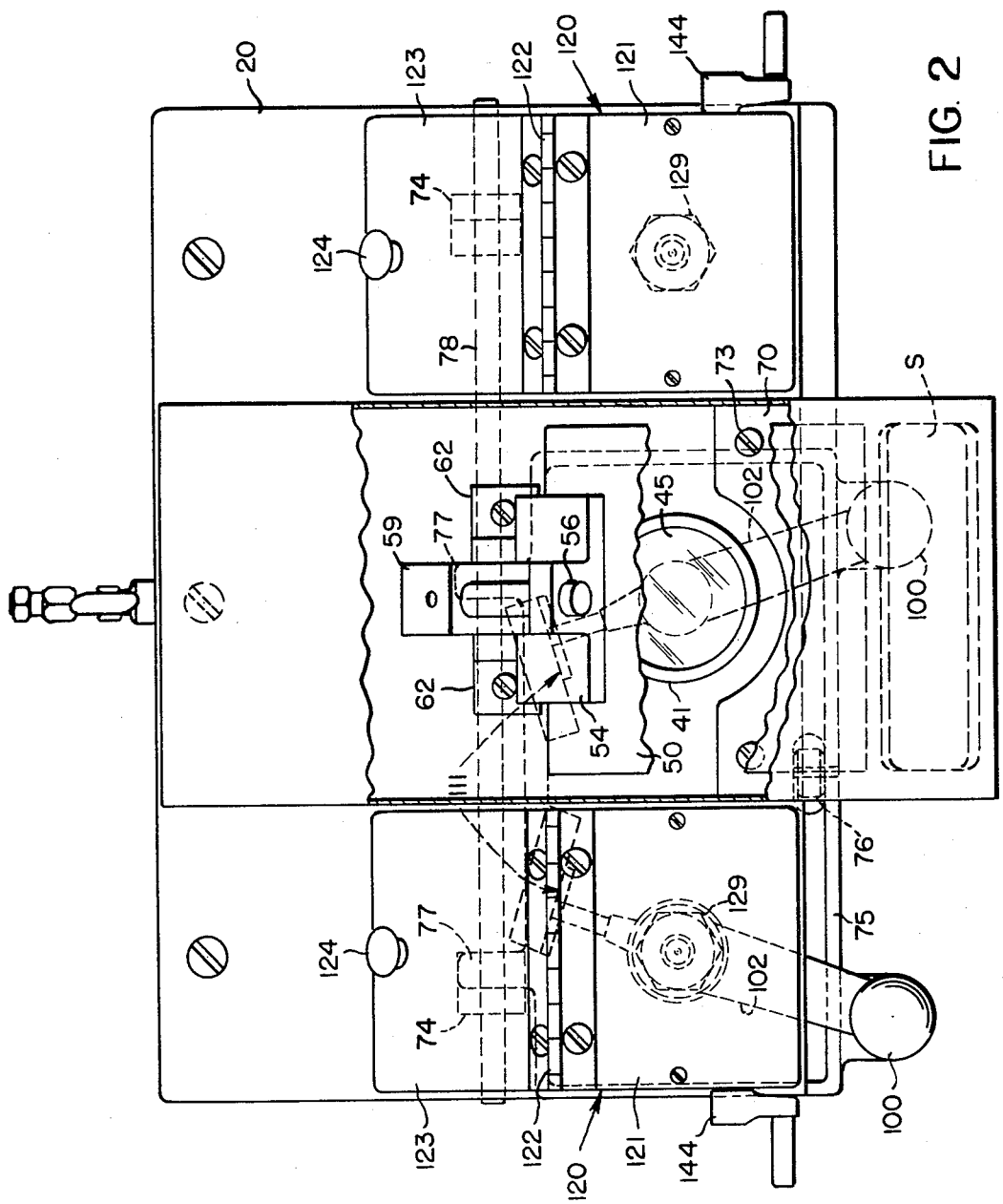
FIG. 2 is a plan view of this machine with parts broken away.
Figure 3:
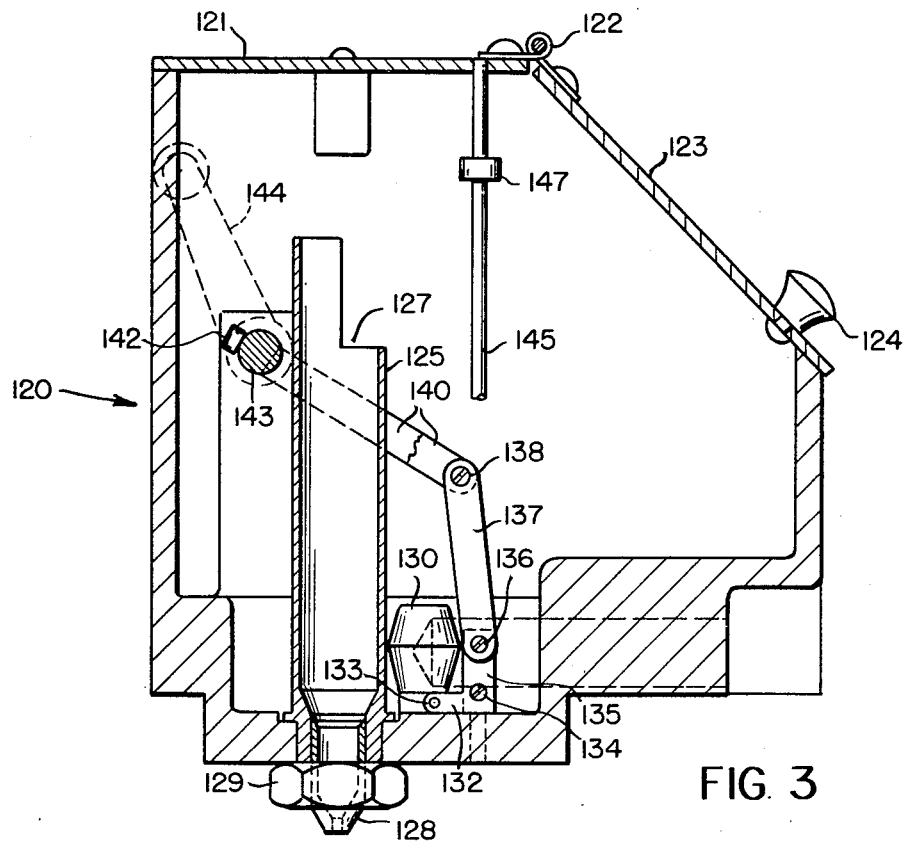
FIG. 3 is a vertical sectional view through one of the pouring pots of this machine.
Figure 4:
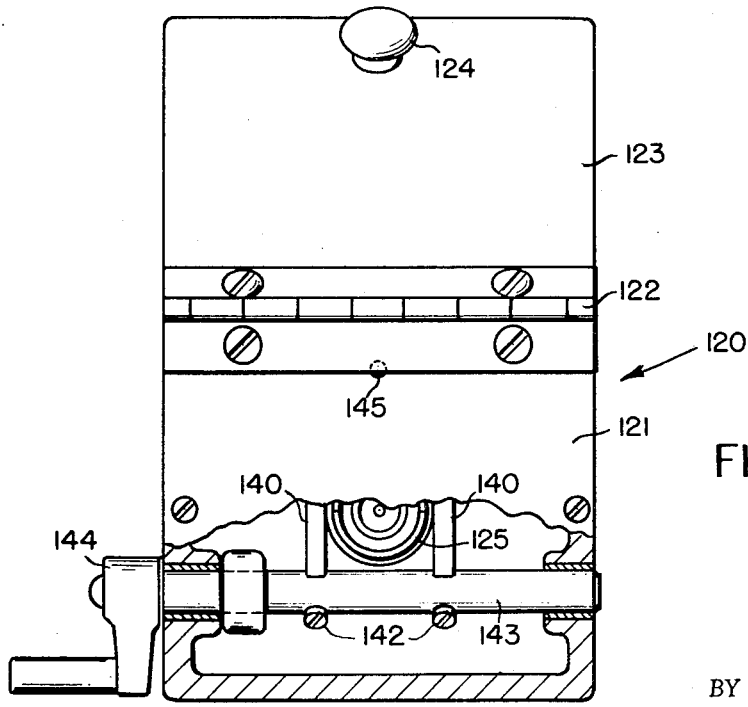
FIG. 4 is a plan view of this pot, part being broken away.

Mounted at opposite sides of housing 40 are two pouring pots 120 (FIGS. 2, 3 and 4). Each pouring pot is adapted to hold a supply of molten alloy from which the blocks are to be molded for holding the lenses that are to be ground.

Each pouring pot is closed at its top by a fixed cover section 121 to which there is hinged by hinge 122 a pivoted cover section 123. The pivoted cover section 123 can be lifted by a knob 124 which is secured thereto to load the pot.

Mounted in each pot 120 is a standpipe 125 which is secured in the bottom of the pot and which is cut away at its top for half of its circumference. A nozzle 128 is mounted in the bottom of each standpipe and is secured therein by a nut 129. A measuring bucket 130 is associated with each standpipe 125. Each bucket 130 is secured to a semi-circular member 132 by pins 133 which project laterally from opposite sides of the bucket at the lower end thereof. The member 132 is secured by screws 134 to a pair of parallel links 135 which are pivotally connected by screws 136 to links 137 that, in turn, are pivotally connected by studs 138 with lever arms 140. These arms are secured by threaded studs 142 to a shaft 143 which is journaled at opposite ends in the associated pot 120, and which has fastened to it at one end a crank arm 144.

A rod 145, which is mounted in each pot, carries an adjustable collar 147, which is adjustably positioned to engage the bucket 130 of that pot, when it is lifted, to determine when the bucket will be dumped, and thereby to determine precisely the amount of alloy which will be delivered from the respective pot into the associated standpipe 125.

Cold water is supplied continuously to each block mold to cool the molded block. The cold water supply tubing is denoted at 150; and the drainage tubing is designated 151. A toggle switch (not shown) on the back of the machine permits turning on and off the target lamp, heaters (not shown) (located in the melting pots), and the thermostats.

In operation, with the slide table in its extreme left position, a lens may be positioned on the right hand station. The right mold arm 102 is then swung clockwise to the side of the machine. A lens blank is then placed, convex side up, on the three lens support posts 86 of the reticle plate 82. The lens blank is then aligned with the reticle grid 83, 84 by observing it on receiving screen S, in accordance with the prescription specification. Since the image as projected on the screen will be reversed, if a lens for the right eye is to be blocked, where the optical center is to be in-set 2 mm., for instance, the lens blank must be moved 2 mm. left on the reticle grid. As viewed on the receiving screen, the lens blank will move right.

Figure 7:
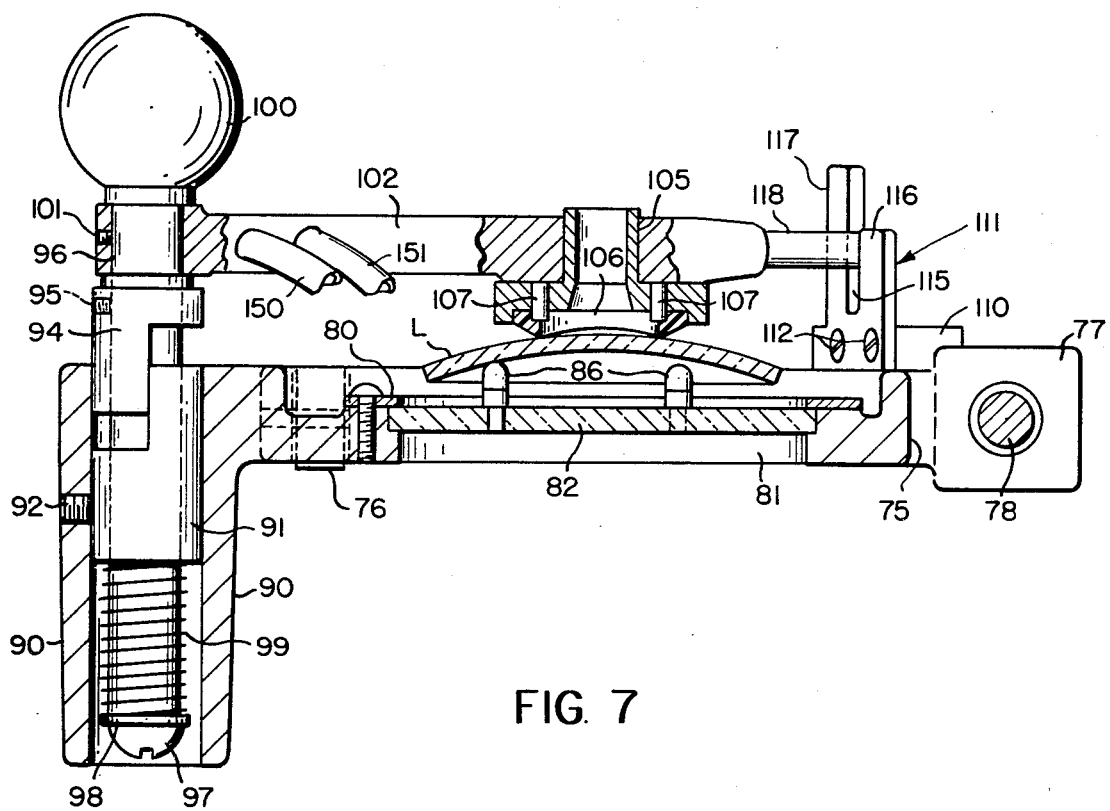
FIG. 7 is a side view of the table, parts being broken away.

When the lens has been accurately positioned, the right mold arm will be swung counterclockwise until the arm rests against the locator stop 117 (FIG. 7). Then the arm is lowered to clamp the lens blank on pins 86 and sealingly against the ring 106 on the underside of the mold. This arm is so designed that its own spring pressure through spring 99 gives it adequate holding power; no manual pressure need be applied.

After the blank has been accurately secured by mold arm 102, the lens table is moved to the extreme right, which would place the lens at this right hand lens station directly under the right hand pouring nozzle 125 in pouring position. Then the right hand pouring lever 144 is pulled down and a measured amount of alloy will be deposited by bucket 130 into the mold 105 to form the edging block.

Then the pouring lever is returned to "fill" position by rotating it back to its original position.

The lens table slide should not now be moved, since it is in proper position to load a lens at the left hand station while allowing the block, which has just been poured at the right hand station, to cool sufficiently so that the lens blank with the block attached thereto, can be easily removed from the mold.

The left hand mold arm is then swung counterclockwise to the side of the machine; and, as before, a lens blank is placed, convex side up, on the three lens support posts 86. The lens and reticle are observed in the receiving screen S; and the lens is aligned, as before, with the reticle grid in accordance with the prescription specifications. The left arm 102 is then swung back to the position shown.

The right hand blocked lens is then removed from its mold by grasping the right mold arm knob 100 and pulling up and swinging the arm clockwise to the side of the machine. The right hand lens, with the mold block adhered thereto, may then be removed from the mold by grasping the lens and carefully pulling down.

Then the lens table is slid to the extreme left position which will position the left hand lens directly under the left pouring nozzle. Then the left hand pouring lever is pulled down and a measured amount of alloy will be deposited into the mold to form the block for holding this lens blank during edge grinding. Then the pouring lever is returned to "fill" position, by rotating it back to its original position.

After the lenses have been edged, they may be placed convex side down on a conventional deblocking ring; and both the lens and the deblocking ring are grasped and the ring is struck lightly against a solid surface. This breaks the block away from the lens; and the block can be put into a reclaim tank for remelting.

The two alloy melting pots are located on top of the machine to the right and left, respectively, of the receiving screen. Each pot will hold sufficient alloy to block several dozen lenses. Each has a heater and thermostat (not shown). The measuring barrel in each pot and the tilting mechanism therefore have been designed to deliver a measured amount of alloy each time the operating lever is pulled down.

While the invention has been described in connection with a specific embodiment thereof, it will be understood that it is capable of further modification; and that this application is intended to cover any variations, uses or adaptations of the invention which come within the disclosure and the limits of the appended claims.

Having thus described our invention, what we claim is:

1. A machine for blocking lens blanks, comprising
a base,
a table reciprocable rectilinearly on said base,
a pair of spaced reticles on said table,
spaced supporting means on said table for holding two lens blanks in registry, respectively, with the two reticles,
locating means on said base to be registrable selectively with said supporting means, upon movement of said table in opposite directions, for precisely locating lenses on said supporting means relative to said reticles,
two molds movably mounted on said table for movement into registry with lens blanks supported on said supporting means,
clamping means associated with each mold to hold a lens blank releasably on its supporting means when a mold is in registry with the lens blank, and
supply means including two dispensers fixed on said base at opposite sides of said locating means to supply molten blocking material to said two molds, respectively,
said table being slidable back and forth on said base to dispose each supporting means and the blank thereon selectively in registry with one of said supply means or said locating means.

2. A machine for blocking lens blanks comprising
a base,
a table reciprocable rectilinearly on said base,
two reticles mounted, respectively, in spaced openings in said base,
lens supporting means associated with each reticle,
a housing secured on said base,
locating means positioned in said housing to cooperate with said reticles to position lens blanks precisely on their respective supporting means,
two molds movably mounted on said table to be movable selectively into and out of registry with the respective lens supporting means,
clamping means associated with each mold for clamping a lens blank between a supporting means and an associated mold, when the associated mold is in registry with a supporting means, and
a pair of dispensers fixed at opposite sides of said locating means for supplying molten blocking material to the two molds, respectively,
said molds being movable into registry with the respective dispensers by sliding movement of said table from one to the other of two limit positions on said base,
said table in each of its limit positions disposing one of said supporting means in registry with said locating means and the other of said supporting means in registry with one of said dispensers.

3. A machine as claimed in claim 2, wherein said locating means comprises a set of projection lenses, a reflector associated therewith, and a rear projection type receiving screen optically cooperating with said reflector and mounted in one wall of said housing to be visible externally of said housing.

4. A machine as claimed in claim 3, wherein a light bulb, a reflector and a set of condenser lenses are mounted in said base to cooperate with the associated reticle when each supporting means is in registry with said locating means to aid in locating a lens blank precisely on the associated supporting means.

5. A machine for blocking lens blanks comprising
a base,
a table reciprocable on said base,
two reticles mounted, respectively, in spaced openings in said base,
lens supporting means associated with each reticle,
a housing mounted on said base,
locating means positioned in said housing to cooperate with said reticles to position lens blanks precisely on said supporting means,
a mold mounted on said table to be movable selectively into and out of registry with each lens supporting means,
clamping means associated with each mold for clamping a lens blank on a supporting means when the associated mold is in registry with each supporting means, and
means disposed at opposite sides of said housing for supplying molten blocking material to the respective molds when the associated mold is moved into registry therewith by movement of said table on said base,
said table being movable on said base to bring each supporting means selectively into registry with said locating means or with the corresponding supply means,
each supply means including a device for delivering a measured amount of the molten blocking material to the associated mold, and
each said device including a pot for holding molten blocking material, a barrel reciprocably and tiltably mounted in each pot, a standpipe mounted in each pot, a nozzle with which each standpipe communicates for delivering molten material into the associated mold, and adjustable means in each pot for controlling the extent of movement of each barrel to determine the quantity of molten material to be delivered into the associated standpipe when said barrel is actuated.

\* \* \* \* \*